United States Patent [19]
Blanc et al.

[11] Patent Number: 5,296,983
[45] Date of Patent: Mar. 22, 1994

[54] SLIDER SPRING UNDER "TENSION-COMPRESSION"

[75] Inventors: Henri Blanc, Saint Julien de Ratz; Gérard Barrois, Le Fontanil; Christian Pisella, Beaucrossant, all of France

[73] Assignee: Commissariat a l'Energie Atomique, France

[21] Appl. No.: 980,470

[22] Filed: Nov. 23, 1992

[30] Foreign Application Priority Data

Nov. 29, 1991 [FR] France .................. 91 14825

[51] Int. Cl.⁵ .............................. G11B 21/16
[52] U.S. Cl. ............................... 360/104
[58] Field of Search ...................... 360/104

[56] References Cited
U.S. PATENT DOCUMENTS 4,605,979 8/1986 Inoue et al. ............. 360/104 X
5,063,465 11/1991 Fujioka .

FOREIGN PATENT DOCUMENTS

0442225A2 12/1990 European Pat. Off. .
2177535A 7/1986 United Kingdom .

Primary Examiner—John H. Wolff
Attorney, Agent, or Firm—Pearne, Gordon, McCoy & Granger

[57] ABSTRACT

The spring for a slider comprises a flexible leaf (30) under compression, a pliable strip (40) under compression and a tongue (48), to which a slider (50) is secured.

12 Claims, 6 Drawing Sheets

SLIDER SPRING UNDER "TENSION-COMPRESSION"

TECHNICAL FIELD

The present invention relates to a spring for a slider, a production process for said spring and a machine for performing said process, it is used in magnetic data recording, particularly on a disk.

PRIOR ART

The magnetic recording of data for computers makes use of high density storage systems. The latter are constituted by one or more thin, rigid disks coated with a magnetic film on which travels, under rapid rotation and without contact, a very small read/write head. The gap of said head defines the width and length of a data element on the disk. Existing dimensions are $12 \times 0.8$ $\mu m$.

This microscopic head is either attached, or directly constructed on a slider, which can be made from a ceramic material or silicon. The present size of such a slider is approximately $2 \times 3$ mm.

This slider is bonded to the end of an arm serving as a spring. The spring has three functions, namely permitting the displacement of the head in the radial direction for seeking a track, maintaining a certain force for engaging the slider on the disk and thus define the movement height of the latter at a given value and supporting and maintaining the electrical connections between the head and the associated electronics.

Figure 1:
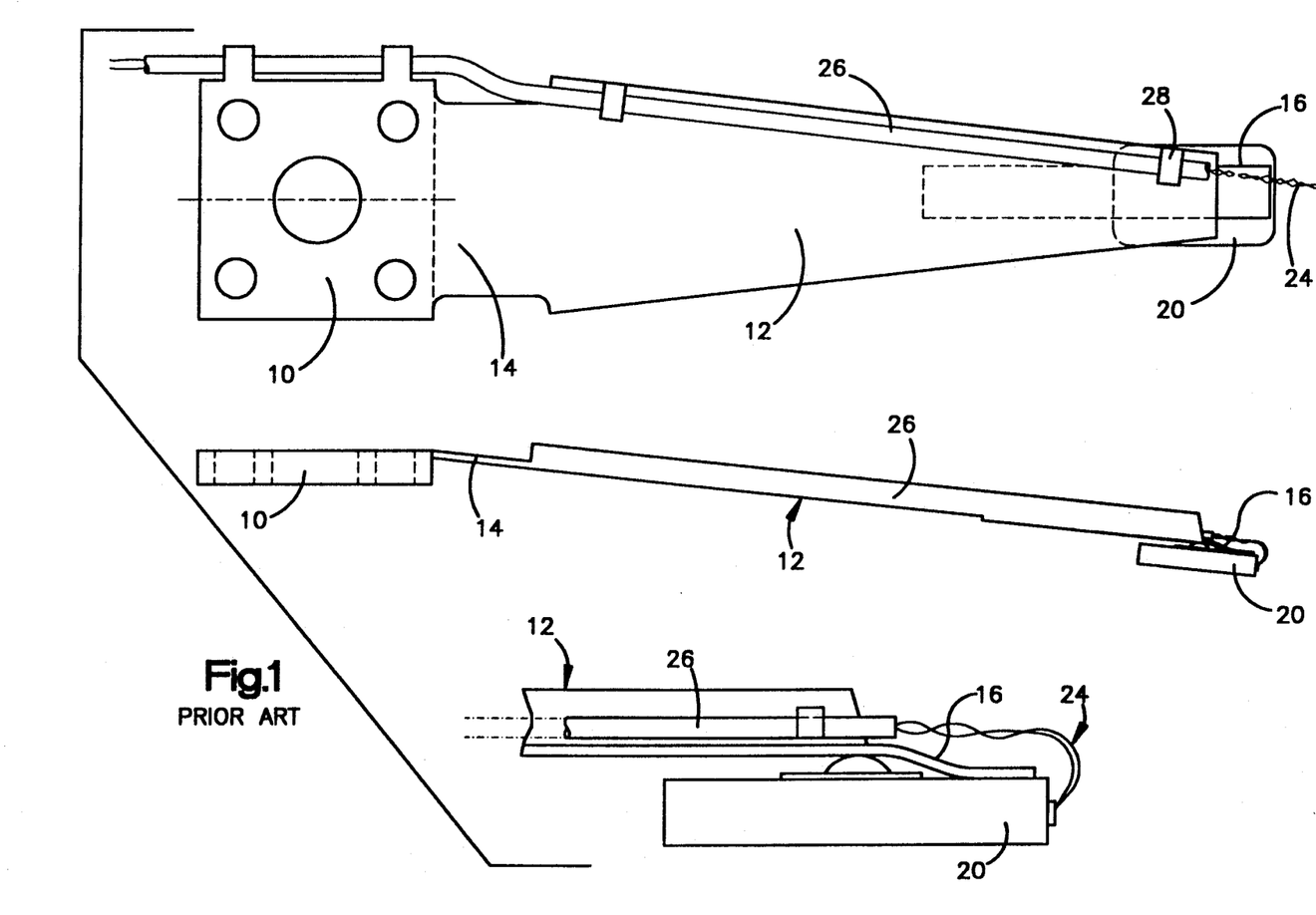
FIG. 1 shows a spring for a slider according to the prior art.

The presently known springs have variable dimensions, but, with the exception of a few details, they are very similar. Such a spring is illustrated in FIG. 1. The spring comprises three main parts. The first is a rigid, thick part 10 used for fixing to the mobile part of the arm. The second is a semi-rigid, trapezoidal part 12 articulated to the rigid part 10 by a deformable, belted zone 14. The latter is an unribbed portion of the semi-rigid part 12, which determines the stiffness of the spring and the force with which it will bear on the head once fitted in the disk unit. The third part is a tongue 16 used for orientation in all the axes (ball joint) of the slider. It is a very thin part and is therefore more pliable than the main spring, being recessed to obtain maximum pliability. On said tongue is accurately positioned and bonded the slider 20 with its not shown magnetic head.

The electrical connection is obtained by two twisted, enamelled copper wires 24 having a diameter of 38 $\mu m$ and which are introduced into a sheath 26. After stripping the ends of the conductors, said sheath is fixed to the spring, by tongs 28 provided in the spring recess, followed by crimping. The twist is belted and shaped in order to obtain a loop having a clearly defined geometry for reuniting the weld locations on the slider (for connectors). After this welds are ultrasonically produced on the contact areas provided, either on the side, or on the rear face of the sliders.

Such an assembly must have thermal stability, an absence of vibrations, low inertia and a limited overall thickness so that it can be inserted in a stack of disks having a spacing of only about 3 mm.

Designed in this way and assembled in the manner described hereinbefore, such spring/connection assemblies represent approximately 30 to 40% of the cost of the complete assemblies. This high cost is explained by the fact that the spring is a relatively complex part of small size. It is produced in several stages, involving cutting, bending and spot welding. Moreover, the springs and the fitting thereof vary significantly as a function of the hard disk unit in which they are to be used. Although their manufacture is industrialized, the diversity of the models leads to relatively small batches and therefore to high costs.

In addition, the handling of such springs, which are fragile and of small size, does not allow an easy automation of the fitting of the sliders. In the same way, the very flexible twists do not have a very precise geometry enabling them to be integrated into automated production lines or chains. Therefore the two latter operations are performed manually in unitary manner.

DESCRIPTION OF THE INVENTION

The present invention aims at obviating the aforementioned disadvantages, i.e. to define a low cost, easy assembly. According to the invention, there is no longer a manufacture of a spring having special dimensions defined at the time of manufacture by the customer. The spring is instead produced essentially from two standard components, one of which is a flexible support without a specific elastic constant, whilst the other, which is very pliable, is a printed minicircuit. It is during the assembly of the two components, which are usable in all cases, that an adjustment occurs, by a special automatic fitting, of the value of the bearing force and the fitting dimensions.

It is with respect to said fitting that the spring/slider connection takes place and in certain cases this can be both electrical and mechanical. It is therefore a question of producing a "prefabricated" spring, which is usable in all cases, i.e. universal.

More specifically, the present invention relates to a spring for a slider, characterized in that it comprises:

a flexible leaf having a first and a second ends, a pliable strip having electrically conductive tracks and a first and a second ends, a means for fixing the first end of the pliable strip beneath the first end of the flexible leaf, the strip projecting slightly beyond the first end of the flexible leaf in order to form a tongue, a slider with one or more magnetic heads, said slider being fixed beneath the tongue, the conductive tracks of the strip being connected to the head, a shim fixed beneath the second end of the flexible leaf and to the flexible strip, the flexible strip being under tension and the flexible leaf under compression, a top to bottom force is thus exerted on the first end of the flexible leaf and consequently on the slider, the second strip having its second end located behind the fixing shim and at a certain distance from the latter.

The present invention also relates to a process for producing said spring. This process is characterized in that it comprises the following operations:

a flexible leaf is cut so as to give it an appropriately shaped first end, beneath said flexible leaf and at a given distance from said first end is fixed a fixing shim and the flexible leaf is cut to the rear of said fixing shim, a pliable strip covered with electrically conductive tracks is cut in order to give it a first, appropriately shaped end, the first end of the flexible leaf is positioned above the first end of the pliable strip, in such a way that the pliable strip projects slightly beyond the first end of the flexible leaf and forms a tongue and the flexible leaf and pliable strip are fixed to one another.

a slider with its magnetic read and/or write head or heads is fixed beneath the tongue of the strip and the electrical connections are made between the head and the conductive tracks of the pliable strip, a tension is exerted on the pliable strip and the flexible leaf is compressed, which leads to a top to bottom force on the first end of the flexible leaf and therefore on the slider, the tension and compression are regulated to that the top to bottom force exerted on the slider has an appropriate value, the fixing shim is fixed to the pliable strip and then the tension from the latter is eliminated, the pliable strip is but behind the fixing part and at a given distance therefrom in order to leave a pliable electrical connection strip.

Finally, the present invention relates to a machine for performing this process. This machine is characterized in that is comprises:

a first station supplied with a first flexible leaf, a second pliable strip coated with electrically conductive tracks and a third strip able to form fixing shims, said first station having means for cutting the flexible leaf, the pliable strip and the third strip for constituting fixing shims, as well as means for fixing a shim beneath the first strip, a second station receiving the flexible leaf and the pliable strip treated by the first station, said second station being supplied with sliders and having means for fixing the end of the flexible leaf to the pliable strip whilst having a tongue, means for bonding a slider beneath the tongue and for producing the electrical connections between the slider and the conductive tracks of the pliable strip, a third station having means for tensioning the pliable strip, means for measuring the force exerted from top to bottom on the slider, means for fixing the pliable strip beneath the fixing shim and means for cutting the pliable strip to the rear of the fixing shim.

BRIEF DESCRIPTION OF THE DRAWINGS

FIGS. 5a–d shows several embodiments of the pliable strip with its conductive tracks.

DETAILED DESCRIPTION OF THE EMBODIMENTS

Figure 2:
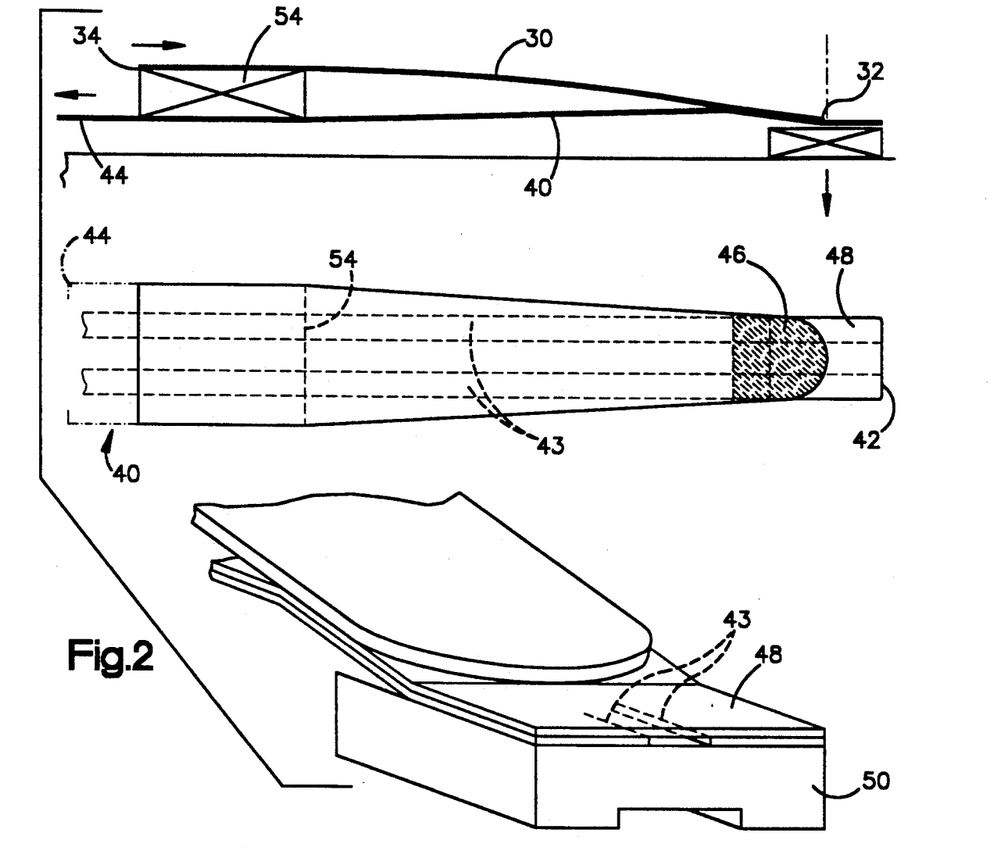
FIG. 2 shows a spring according to the invention.

The assembly shown in FIG. 2 comprises the following items:

a flexible leaf 30 having a first end 32, which is preferably rounded and a second end 34. This leaf can be made from a fibreglass/epoxy, carbon fibre/epoxy or Kevlar/epoxy composite. Its thickness can vary between 0.1 and 0.3 mm. It is obtained from a precut strip to the desired width and is then wound. This material is used as a result of its lightness and very considerable rigidity in compression in the direction of the fibres.

a pliable strip 40 having electrically conductive tracks 43. The conductive tracks 43 of the pliable strip 40 can be located on the face of the latter in contact with the flexible leaf 30, or on the other face in contact with the slider 50, or simultaneously on both faces. This strip has a first end 42 and a second end 44. The strip is made from type V KAPTON (registered trade mark) (marketed by DUPONT) having a thickness between 25 and 75 μm and which supports two coppered tracks.

a means 46 for fixing (bonding, welding, brazing) the first end 42 of the pliable strip 40 beneath the first end 32 of the flexible leaf 30, the strip 40 projecting slightly beyond the first end 32 of the flexible leaf 30 in order to form a tongue 48.

a slider 50 fixed beneath the tongue 48, said tongue projecting beyond the leaf 30 preferably by a half-length of the slider, or a half-width (as a function of the fitting), so that the end 32 of the upper leaf 30 bear precisely in the geometrical centre of the slider, once the bonded, welded, or brazed slider is in perfect alignment with the edges of said tongue. The tracks 43 can be positioned on the face of the strip 40 in contact with the flexible leaf 30 (FIG. 4F), or on the face in contact with the slider 50 (FIG. 4E), or on the two faces.

a shim 54 fixed beneath the second end 34 of the flexible leaf 30 and on the pliable strip 40. This shim can have a relatively large thickness of approximately 05 to 1.2 mm as a function of the fitting, between the leaf and the strip. This stack is bonded, crimped or riveted under stress. The lower strip 40 is placed under tension and the upper leaf 30 under compression. The variation between the application point of the tension to the lower strip and that of its reaction on the upper leaf produces a vertical top to bottom component on the end of the spring where the head is fixed.

As the pliable strip 40 is under tension between the shim 54 and the fixing means 46 and as the flexible leaf 30 is under compression, a top to bottom force is exerted on the first end 32 of the leaf 30 and consequently on the slider.

The strip 40 has its second end 44 positioned behind the fixing shim 54 and at a certain distance Y therefrom.

The effect of the swivelling obtained on conventional springs by a spherical portion of the tongue bearing on the spring is obtained in the case of the invention by the combined effect of the roundness of the end of the upper leaf and the angular deflection thereof.

Although the degree of freedom is very small, it is sufficient to absorb any rolling of the slider of a few radians. It is possible to adjust the shape of the end 32 in order to increase or decrease this effect for each type of spring.

Figure 3:
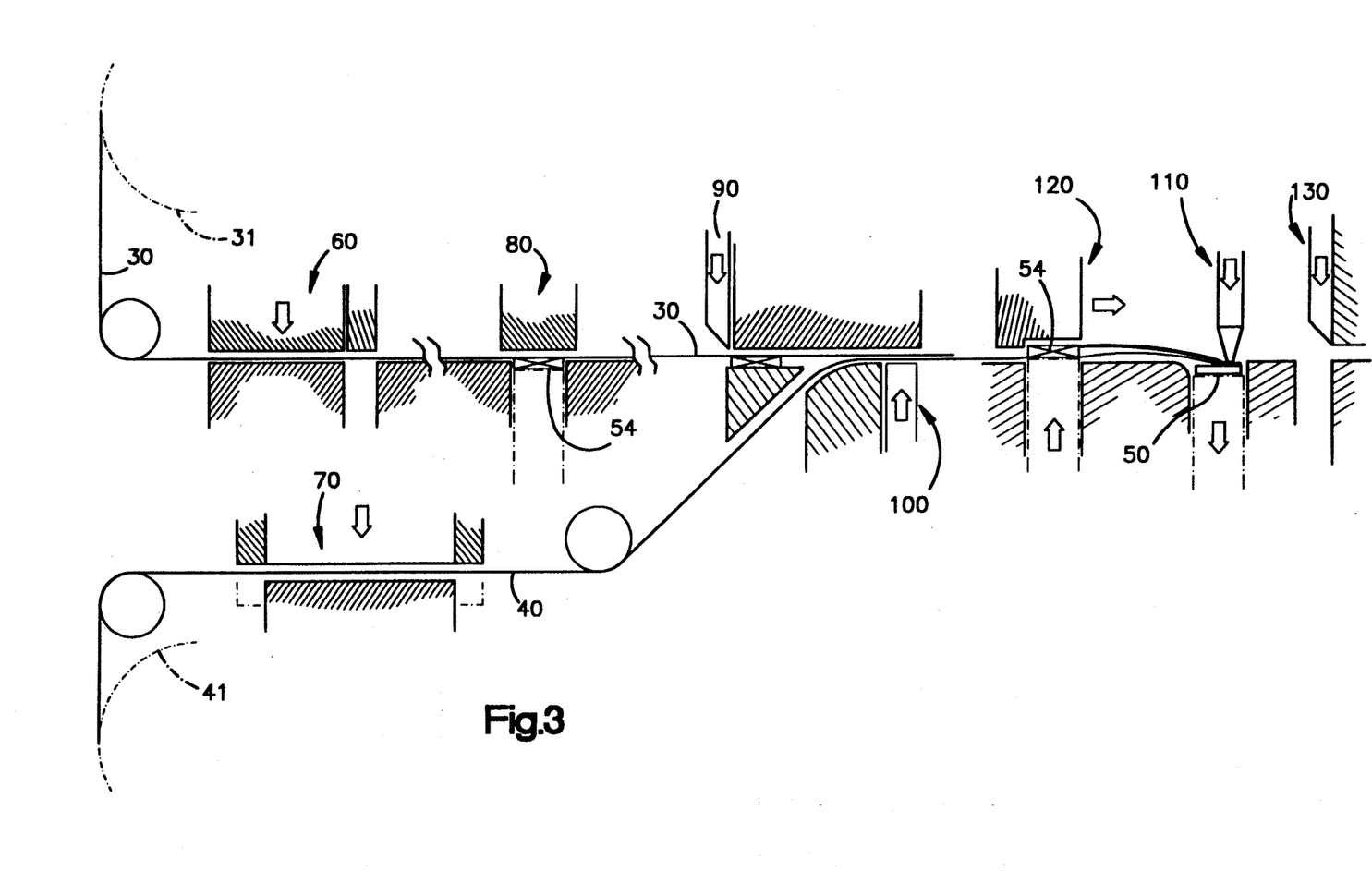
FIG. 3 illustrates the general process for the production of the spring according to the invention.
Figure 4A:
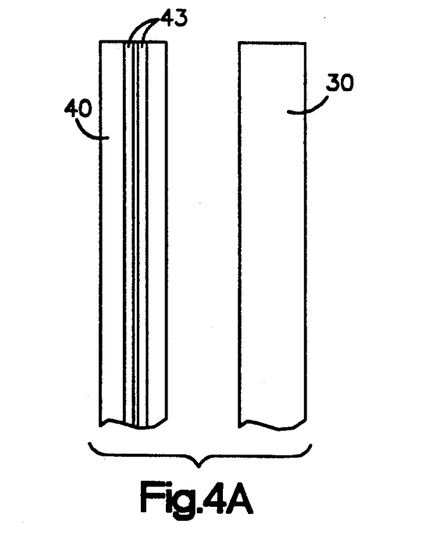
FIGS. 4A, 4B, . . . , 4K illustrates different stages of a production process.
Figure 4B:
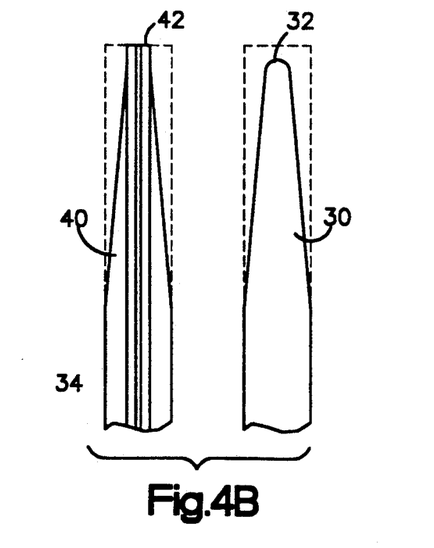
Figure 4C:
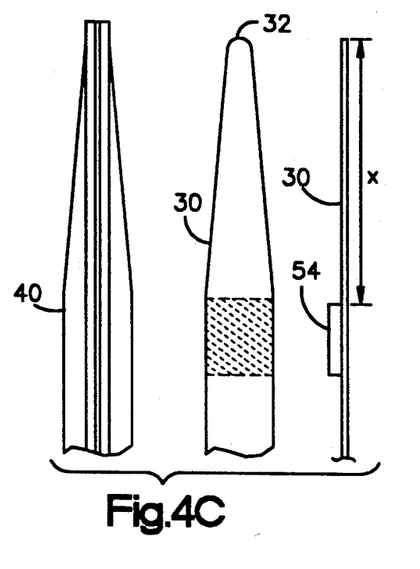
Figure 4D:
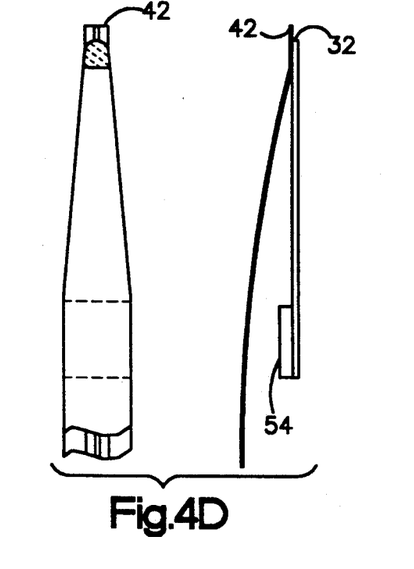
Figure 4E:
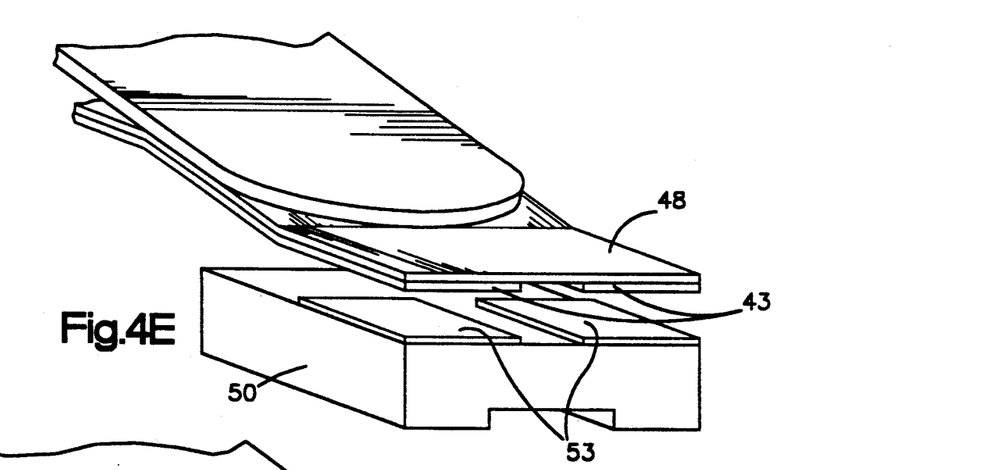
Figure 4F:
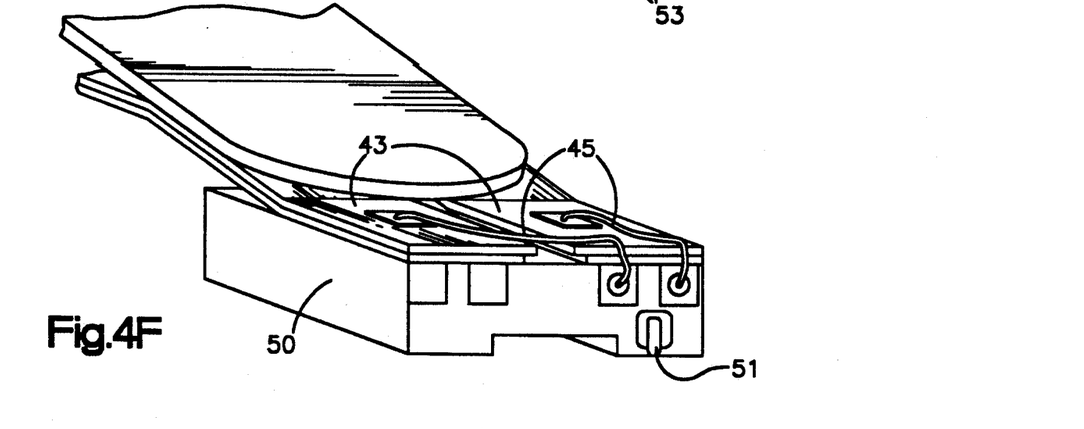
Figure 4G:
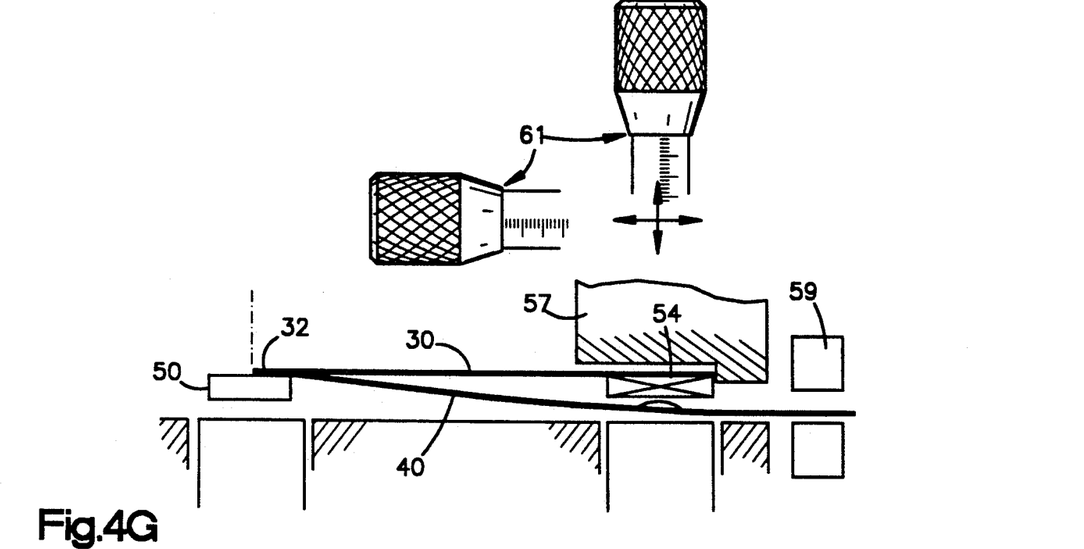
Figure 4H:
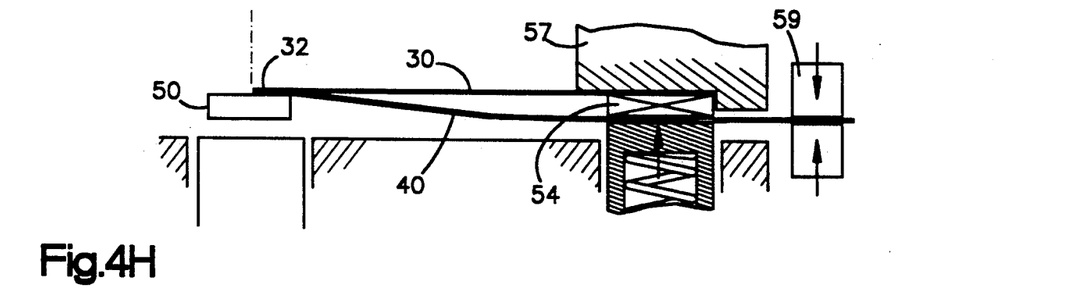
Figure 4I:
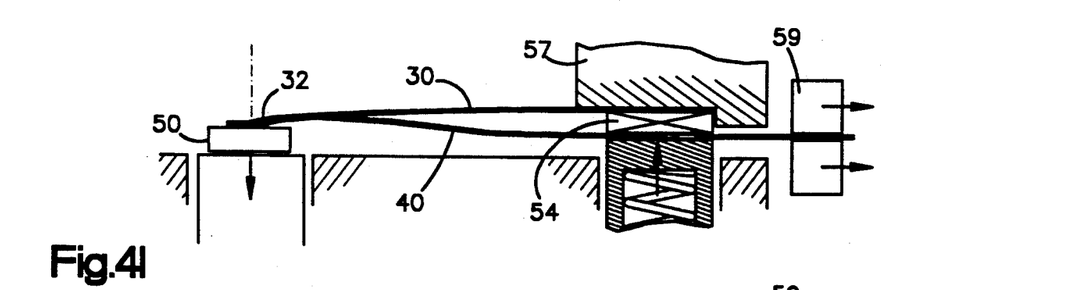
Figure 4J:
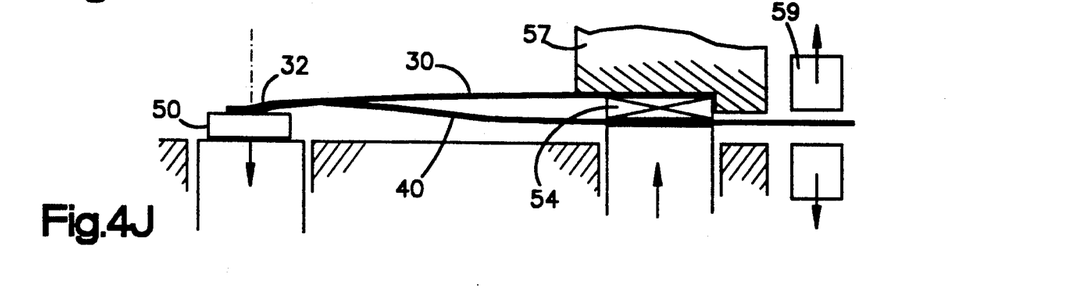

FIG. 3 diagrammatically shows the main stages of a process for the production of the spring described hereinbefore. These stages are illustrated in greater detail in FIGS. 4A to 4K:

Stage 60: the flexible leaf 30 from a reel 31 (FIG. 4A) is cut to give it an appropriately shaped and e.g. rounded first end (FIG. 4B);

Stage 70: the pliable strip 40 from a reel 41 is cut, said strip being covered with electrically conductive track 43 (FIG. 4A) in order to give it an appropriately shaped first end (FIG. 4B);

Stage 80: beneath the flexible leaf 30 and at a given distance X from the first end 32 is fixed a fixing shim 54 (FIG. 4C);

Stage 90: the flexible leaf 30 is cut to the rear of the fixing shim 54 (FIG. 4D);

Stage 100: the first end 32 of the flexible leaf 30 is positioned above the first end 42 of the pliable strip 40, so that the latter projects slightly beyond the end of the flexible strip 30 and forms a tongue 48 and the strip and leaf are fixed to one another (FIG. 4D);

Stage 110: a slider 50 with its magnetic read and/or write head 51 is fixed beneath the tongue 48 of the strip 40 (FIG. 4E). In FIG. 4E it is possible to see conductive adhesive blocks 53 on which will bear the tracks 43. This is followed by the production of the electrical connections 45 between the head 51 and the conductive tracks 43 of the pliable strip (FIG. 4F);

Stage 120: the fitting 57, 59 of the assembly of the spring is regulated as a function of the z-height of the spring in the unity of the hard disk by means of micrometer screws 61 and then a tension is exerted on the pliable strip 40 and a compression on the flexible leaf 30. For this purpose, the shim 54 is placed against an abutment 57 (FIG. 4G). The pliable strip 40 is grasped in tongs 59 (FIG. 4H) and a tension T is exerted thereon (FIG. 4I). This simultaneously places the strip 40 under tension and the leaf 30 under compression, which produces a top to bottom force on the first end of the leaf and therefore on the slider 50. The tension and compression are regulated so that the force N exerted on the slider 50 has an appropriate value (FIG. 4I). The leaf 50, shim 54 and strip 40 are locked together (FIG. 4J). The fixing shim 54 is fixed to the pliable strip 40, e.g. by bonding and said strip 40 is placed under tension (FIG. 4J).

Stage 130: the pliable strip is cut at the end 44 located behind the fixing part and at a given distance Y therefrom (FIG. 4K), so as to leave a pliable strip permitting the electrical connection to the support arm of the slider.

Figure 5:
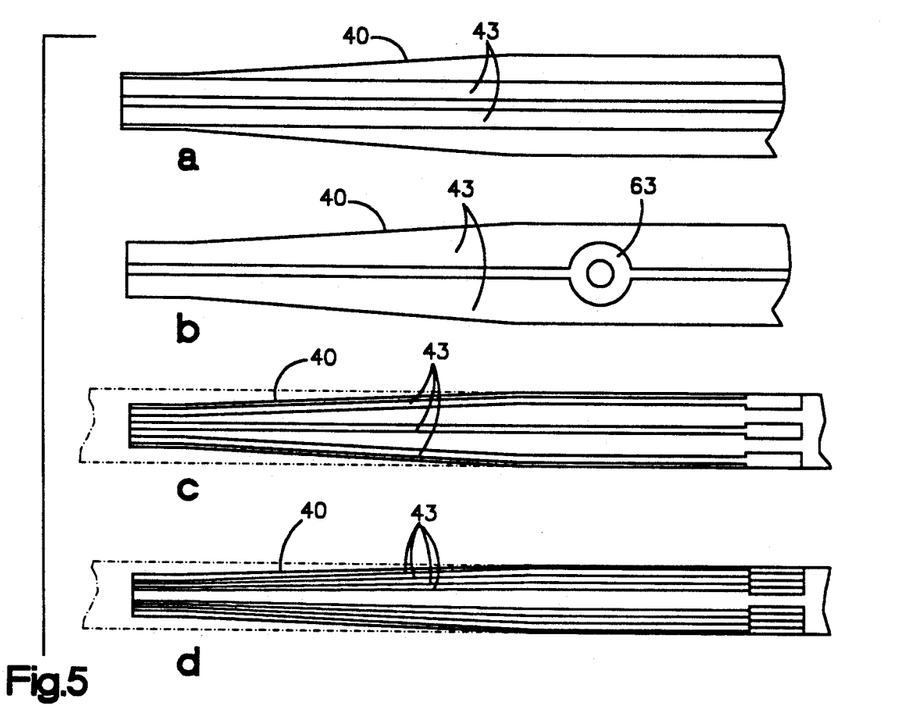

FIG. 5 shows four different embodiments of a pliable strip 40 with conductive tracks 43. In part a, the two tracks are narrow and continuous, having a width of 0.5 to 0.8 mm and a spacing of 0.2 to 0.4 mm. In part b, these continuous tracks are wide and occupy the entire width of the strip. This variant corresponds to a fitting by riveting. It is then necessary to provide an opening 63 for the rivet. In part c it is possible to see three tracks with contact studs and in part d two groups of several tracks. In these two latter embodiments, the tracks constitute independent patterns reproduced in periodic manner on the pliable, continuous strip 40.

Figure 6:
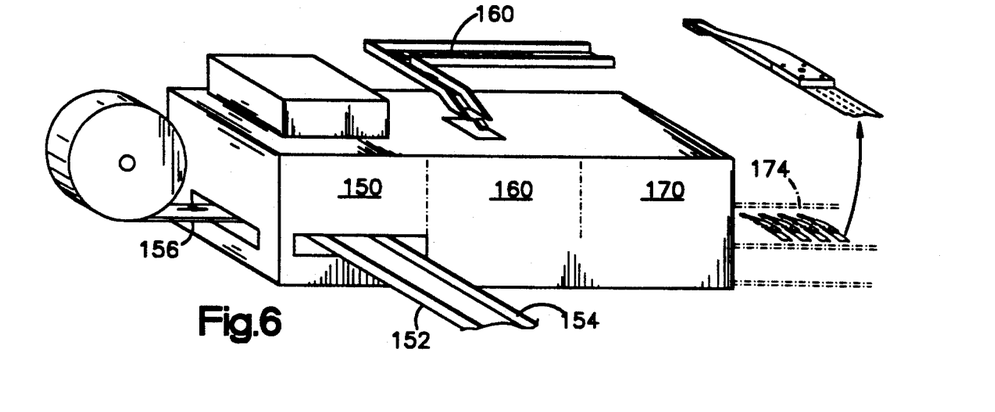
FIG. 6 shows the organization of a machine for performing the process according to the invention.

FIG. 6 shows the general architecture of a machine for carrying out the process described hereinbefore and which comprises:

A first station 150 supplied with the first flexible relief 152 and the second pliable strip 154 covered with electrically conductive tracks, as well as a third strip 156 for forming fixing shims. This first station comprises means for cutting the flexible leaf and the pliable strip, as well as means for cutting the third strip for forming the shims. It also comprises means for fixing a shim beneath the first leaf, as explained in conjunction with FIGS. 3, 4A, 4B and 4C.

A second station 160 receives the flexible leaf and pliable strip treated by the first station. This second station is supplied with sliders by means 162. This second station comprises means for fixing the end of the first leaf to the first strip whilst leaving a tongue, means for bonding a slider beneath the tongue and for producing the electrical connections between the slider and the conductive tracks of the pliable strip, as explained in conjunction with FIGS. 3, 4D, 4E and 4F.

Figure 4K:
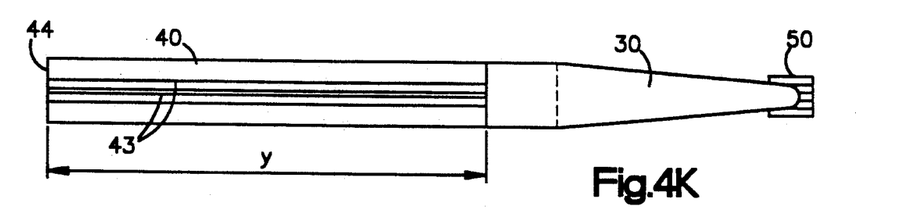

A third station 170 has means for placing the pliable strip under tension, means 61 (FIG. 4G) for regulating the z-height of the hard disk unit, means for measuring the force exerted from top to bottom on the slider, means for fixing the pliable strip beneath the fixing shim, as explained in conjunction with FIGS. 4G, 4H, 4I and 4J and means for cutting the pliable strip at a given distance Y from the fixing shim (FIG. 4K).

We claim:

1. Spring for a slider, characterized in that it comprises:
   a flexible leaf (30) having a first and a second ends (32,34),
   a pliable strip (40) having electrically conductive tracks (43) and a first and a second ends (42, 44),
   a means (46) for fixing the first end (42) of the pliable strip (40) beneath the first end (32) of the flexible leaf (30), the strip (40) projecting slightly beyond the first end (32) of the flexible leaf (30) in order to form a tongue (48),
   a slider (50) with one or more magnetic heads (51), said slider (50) being fixed beneath the tongue (48), the conductive tracks (43) of the strip being connected to the head (51),
   a shim (54) fixed beneath the second end (34) of the flexible leaf (30) and to the flexible strip (40),
   the pliable strip (40) being under tension between the shim (54) and the fixing means (46) and the flexible leaf (30) under compression, a top to bottom force is thus exerted on the first end (32) of the flexible leaf (30) and consequently on the slider (50),
   the second strip (40) having its second end (44) located behind the fixing shim (54) and at a certain distance (Y) from the latter.

2. Spring according to claim 1, characterized in that the means (46) for fixing the first end (32) of the flexible leaf (30) to the pliable strip (40) is a bonding, welding or brazing means.

3. Spring according to claim 1, characterized in that the second end (34) of the flexible leaf (30), the shim (54) and the pliable strip (40) are bonded, riveted or welded.

4. Spring according to claim 1, characterized in that the flexible leaf (30) has a certain width level with the shim (54) and a width which decreases towards the first end (32).

5. Spring according to claim 4, characterized in that the first end (32) of the flexible leaf (30) is rounded.

6. Spring according to claim 1, characterized in that the tongue (48) projects beyond the first end (32) of the flexible leaf (30) by a half-length or half-width of the slider (50), the first end (32) of the flexible leaf (30) being located just above the geometrical centre of the slider (50).

7. Spring according to claim 1, characterized in that the pliable strip (40) is constituted by a pliable, insulating sheet on one face of which are made the conductive tracks (43).

8. Spring according to claim 6, characterized in that the flexible leaf (30) has a thickness between 0.1 and 0.3 mm.

9. Spring according to claim 8, characterized in that the flexible leaf is made from a fibre/resin composite.

10. Spring according to claim 9, characterized in that the flexible leaf is made from a fibreglass/epoxy, carbon fibre/epoxy or Kevlar/epoxy composite.

11. Spring according to claim 8, characterized in that the pliable strip (40) has a thickness between 25 and 75 µm.

12. Spring according to claim 11, characterized in that the pliable strip (40) is made from a Kapton-type material.

* * * * *

UNITED STATES PATENT AND TRADEMARK OFFICE
CERTIFICATE OF CORRECTION

PATENT NO.   : 5,296,983
DATED        : March 22, 1994
INVENTOR(S)  : Henri Blanc, et al.

It is certified that error appears in the above-indentified patent and that said Letters Patent is hereby corrected as shown below:

On the title page, item [75], change "Beaucrossant" to --beaucroissant--.

Column 2, line 54, delete "shin" and insert --shim--.

Column 3, line 2, delete "." (period) and insert --,-- (comma);

line 11, delete "to" and insert --so--;

line 16, delete "but" and insert --cut--; and         line 33, delete "having" and insert --leaving--.

Column 4, line 27, delete "05" and insert --0.5--; and line 61, delete "track" and insert --tracks--.

Signed and Sealed this

Twenty-third Day of August, 1994

Attest:

BRUCE LEHMAN

*Attesting Officer*     *Commissioner of Patents and Trademarks*